(12) United States Patent
Adachi

(10) Patent No.: US 11,322,023 B2
(45) Date of Patent: May 3, 2022

(54) DRIVING SUPPORT APPARATUS

(71) Applicant: TOYOTA JIDOSHA KABUSHIKI KAISHA, Toyota (JP)

(72) Inventor: Masahiko Adachi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 16/288,610

(22) Filed: Feb. 28, 2019

(65) Prior Publication Data

US 2019/0272751 A1 Sep. 5, 2019

(30) Foreign Application Priority Data

Mar. 1, 2018 (JP) .............................. JP2018-036369

(51) Int. Cl.
*G08G 1/095* (2006.01)
*G08G 1/0967* (2006.01)
*G05D 1/02* (2020.01)

(52) U.S. Cl.
CPC ..... *G08G 1/096725* (2013.01); *G05D 1/0223* (2013.01); *G05D 1/0234* (2013.01); *G08G 1/095* (2013.01); *G05D 2201/0213* (2013.01)

(58) Field of Classification Search
CPC ............. G08G 1/096725; G08G 1/095; G08G 1/09623; G05D 1/0223; G05D 1/0234; G05D 2201/0213; B60W 30/18154; B60W 2555/60; B60W 2554/802; B60W 2420/42; B60W 50/00; B60W 30/18109; B60W 40/02
See application file for complete search history.

(56) References Cited

U.S. PATENT DOCUMENTS

| | | | |
|---|---|---|---|
| 2006/0224294 A1* | 10/2006 | Kawazoe | B60W 30/16 701/93 |
| 2011/0029195 A1 | 2/2011 | Yamada et al. | |
| 2018/0215386 A1* | 8/2018 | Naserian | F02D 41/042 |
| 2019/0344801 A1* | 11/2019 | Ishii | B60W 30/18 |
| 2020/0058221 A1* | 2/2020 | Li | G08G 1/095 |

FOREIGN PATENT DOCUMENTS

| | | |
|---|---|---|
| CN | 101772791 A | 7/2010 |
| JP | 2009-42823 A | 2/2009 |
| JP | 2010-250600 A | 11/2010 |
| JP | 2011-221757 A | 11/2011 |
| JP | 2013-196639 A | 9/2013 |
| JP | 2014-98965 A | 5/2014 |

OTHER PUBLICATIONS

James STOUT_07SEPT2017 (Year: 2017).*

* cited by examiner

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

A driving support apparatus is provided with: a recognizer configured to recognize a light of a traffic light that exists ahead of a host vehicle; and a controller configured to perform a deceleration support control if the host vehicle needs to be decelerated on the basis of the recognized light. The controller is configured to suppress a degree of the deceleration support control if the host vehicle needs to be decelerated on the basis of the recognized light and if the recognized light includes a light indicating permission to travel in a particular direction, in comparison with when the recognized light does not include the light indicating the permission to travel in the particular direction.

2 Claims, 7 Drawing Sheets

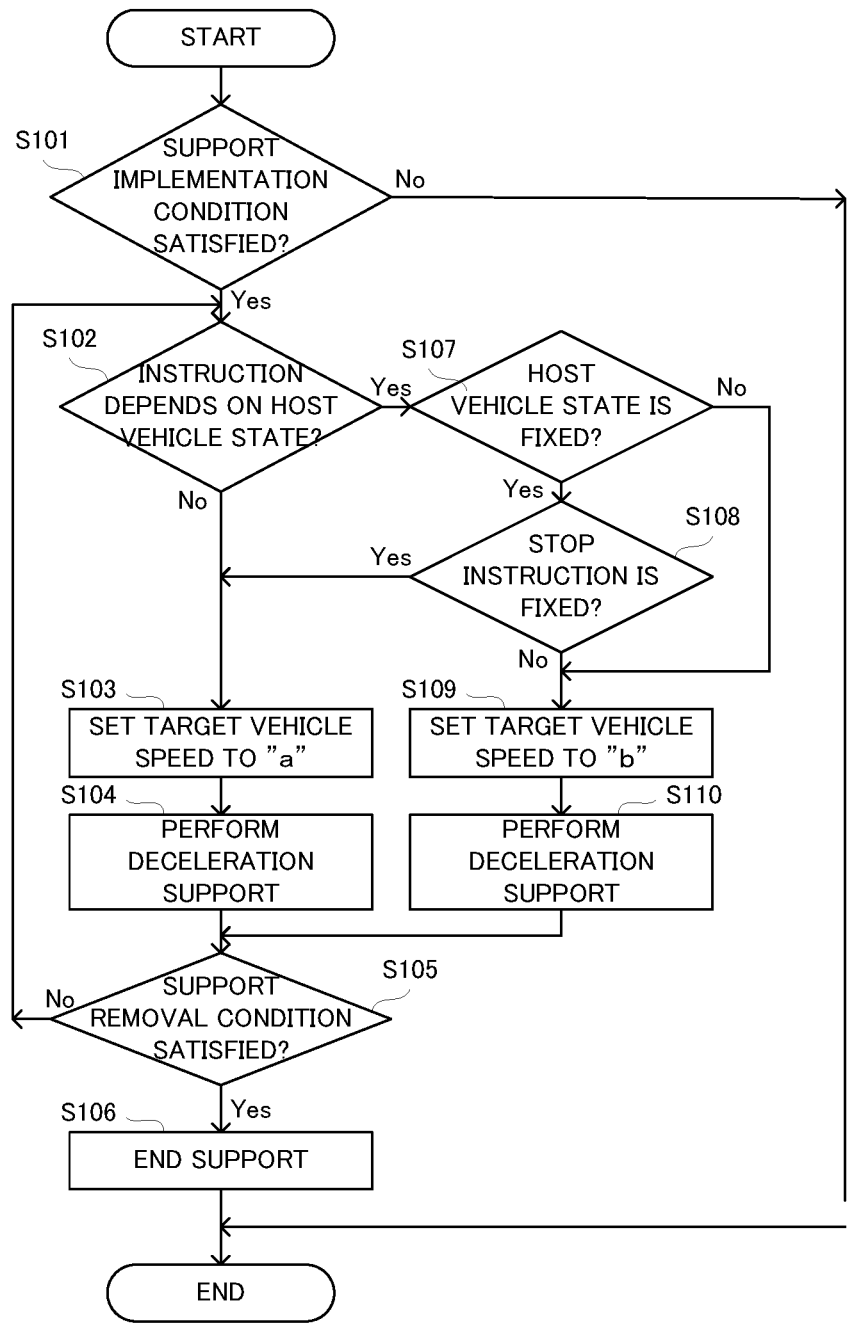

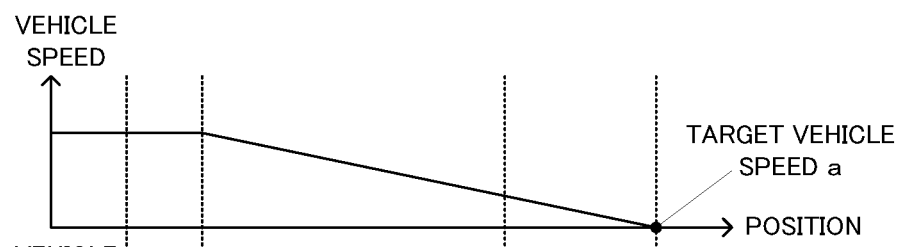
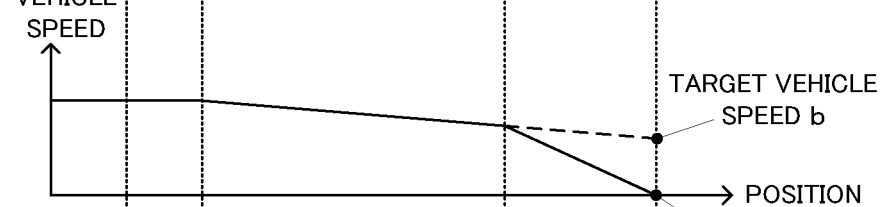
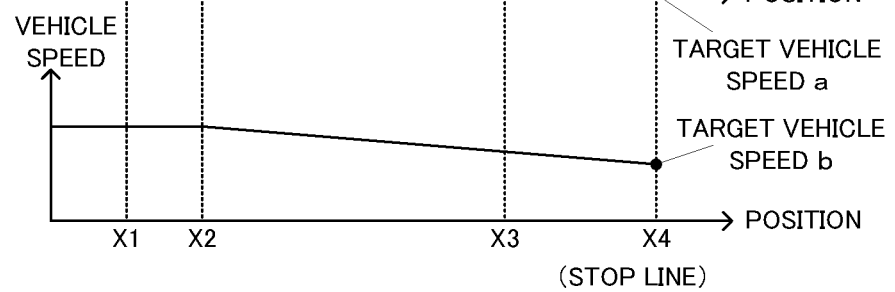

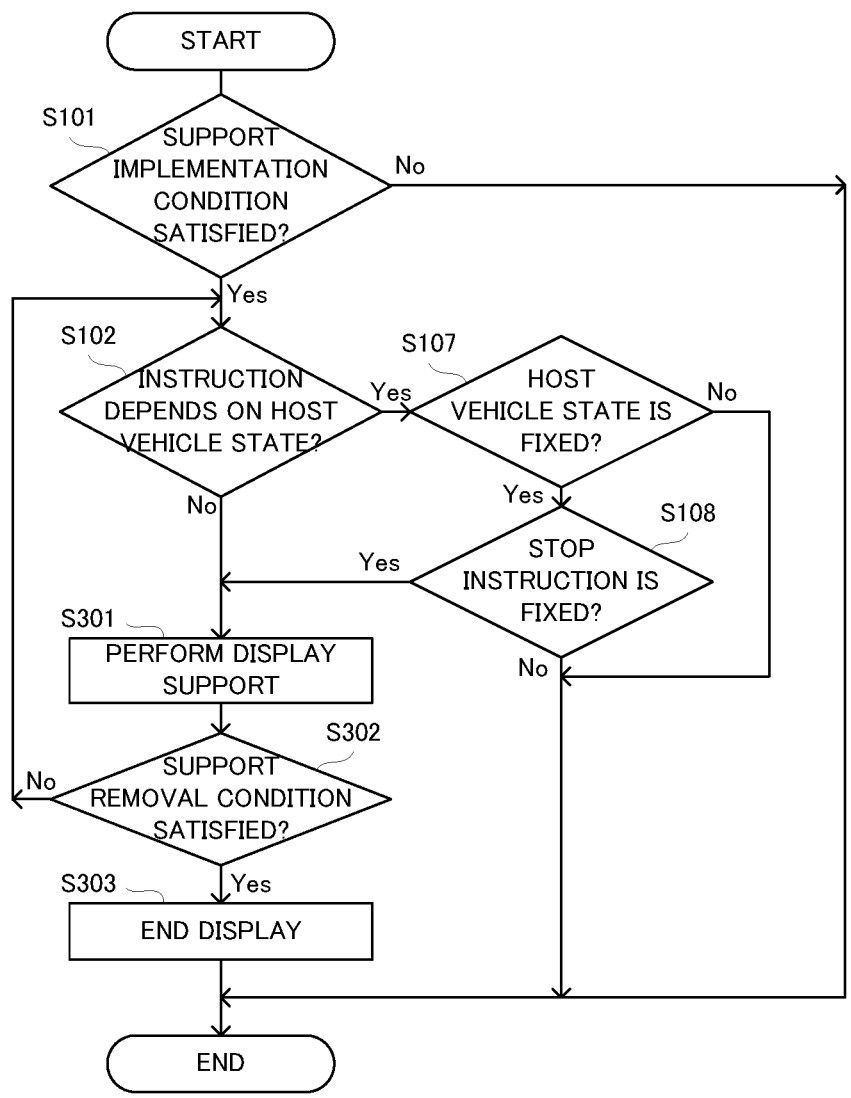

DRIVING SUPPORT APPARATUS

CROSS-REFERENCE TO RELATED APPLICATIONS

This application is based upon and claims the benefit of priority of the prior Japanese Patent Application No. 2018-036369, filed on Mar. 1, 2018, the entire contents of which are incorporated herein by reference.

BACKGROUND

1. Technical Field

Embodiments of the present disclosure relate to a driving support apparatus, and particularly relate to a driving support apparatus configured to recognize, for example, a red light or the like, and to perform a deceleration support.

2. Description of the Related Art

For this type of apparatus, for example, there is proposed an apparatus configured to perform a driving support by setting a target stop position at which a host vehicle is stopped, for a preceding vehicle or a stop vehicle if a light color of a traffic light is red or yellow and if the preceding vehicle is recognized or there is the stop vehicle, and configured to perform the driving support by setting a target stop position of the host vehicle for the traffic light if the preceding vehicle is not recognized and there is no stop vehicle (refer to Japanese Patent Application Laid Open No. 2013-196639 (Patent Literature 1)).

In the technology/technique disclosed in the Patent Literature 1, there is a technical problem that an arrow traffic light is not considered.

In view of the aforementioned problems, it is therefore an object of embodiments of the present disclosure to provide a driving support apparatus configured to perform a deceleration support that takes into account the arrow traffic light.

The above object of embodiments of the present disclosure can be achieved by a driving support apparatus provided with: a recognizer configured to recognize a light of a traffic light that exists ahead of a host vehicle; and a controller configured to perform a deceleration support control if the host vehicle needs to be decelerated on the basis of the recognized light, wherein the controller is configured to suppress a degree of the deceleration support control if the host vehicle needs to be decelerated on the basis of the recognized light and if the recognized light includes a light indicating permission to travel in a particular direction, in comparison with when the recognized light does not include the light indicating the permission to travel in the particular direction.

BRIEF DESCRIPTION OF THE DRAWINGS

FIG. 3 is a flowchart illustrating a deceleration support control process according to the first embodiment;

FIG. 4A is a graph illustrating an example of a change in a vehicle speed caused by the deceleration support control process according to the first embodiment;

FIG. 4B is a graph illustrating an example of the change in the vehicle speed caused by the deceleration support control process according to the first embodiment;

FIG. 4C is a graph illustrating an example of the change in the vehicle speed caused by the deceleration support control process according to the first embodiment;

FIG. 7 is a flowchart illustrating a display support process according to a second embodiment.

DETAILED DESCRIPTION OF THE EMBODIMENTS

A driving support apparatus according to embodiments of the present disclosure will be explained with reference to the drawings.

First Embodiment

Figure 1:
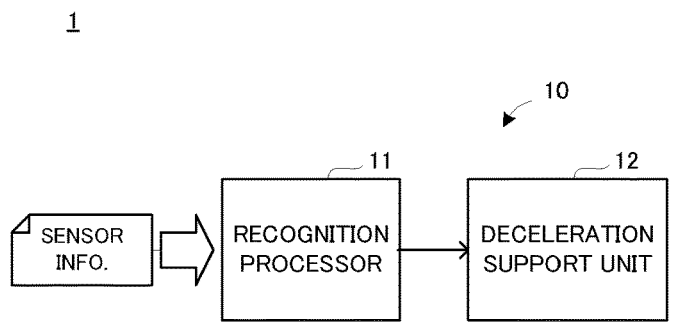
FIG. 1 is a block diagram illustrating a configuration of a driving support apparatus according to a first embodiment.

A driving support apparatus according to a first embodiment will be explained with reference to FIG. 1 to FIG. 4C.
(Configuration)
A configuration of the driving support apparatus according to the first embodiment will be explained with reference to FIG. 1. FIG. 1 is a block diagram illustrating the configuration of the driving support apparatus according to the first embodiment.

In FIG. 1, a driving support apparatus 10 is mounted on a vehicle 1. In the first embodiment, the vehicle 1 shall be driven by a driver; namely, the vehicle 1 is not an automatic drive vehicle. Moreover, a course of the vehicle 1 shall be unknown; namely, the course of the vehicle 1 is not set, for example, by a navigation apparatus or the like.

The driving support apparatus 10 is provided with a recognition processor 11 and a deceleration support unit 12.

The recognition processor 11 is configured to obtain sensor information indicating a surrounding environment of the vehicle 1. Specific examples of the sensor information may be (i) images taken by a camera mounted on the vehicle 1 (or a so-called in-vehicle camera), (ii) output information from a laser sensor, a radar sensor, an ultrasonic wave sensor, or the like, (iii) information obtained via a communication network, such as, for example, the Internet, (iv) information obtained via a beacon, road-vehicle communication, or the like (or information obtained by a so-called infrastructure cooperation system), and so on.

The recognition processor 11 is configured to recognize a traffic light located ahead on the course of the vehicle 1 from the surrounding environment of the vehicle 1 indicated by the sensor information. If the traffic light is recognized, the recognition processor 11 is configured to further recognize a light of the traffic light. Various existing aspects can be applied to a technology/technique of recognizing a particular target (which is herein the traffic light and the light of the traffic light) from the sensor information, and a detailed explanation of the technology/technique will be thus omitted.

The deceleration support unit 12 is configured to determine whether or not the vehicle 1 needs to be decelerated on the basis of the light of the traffic light, if the traffic light is recognized by the recognition processor 11. If it is determined that the vehicle 1 needs to be decelerated, the deceleration support unit 12 is configured to perform a deceleration support control.

Figure 2A:
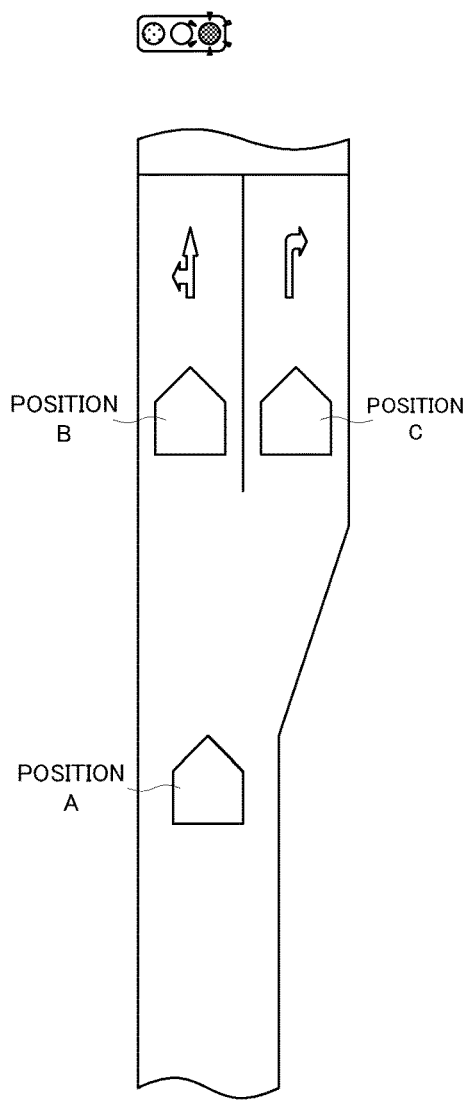
FIG. 2A is a diagram illustrating an intersection as an example of a support target of the driving support apparatus according to the first embodiment.
Figure 2B:
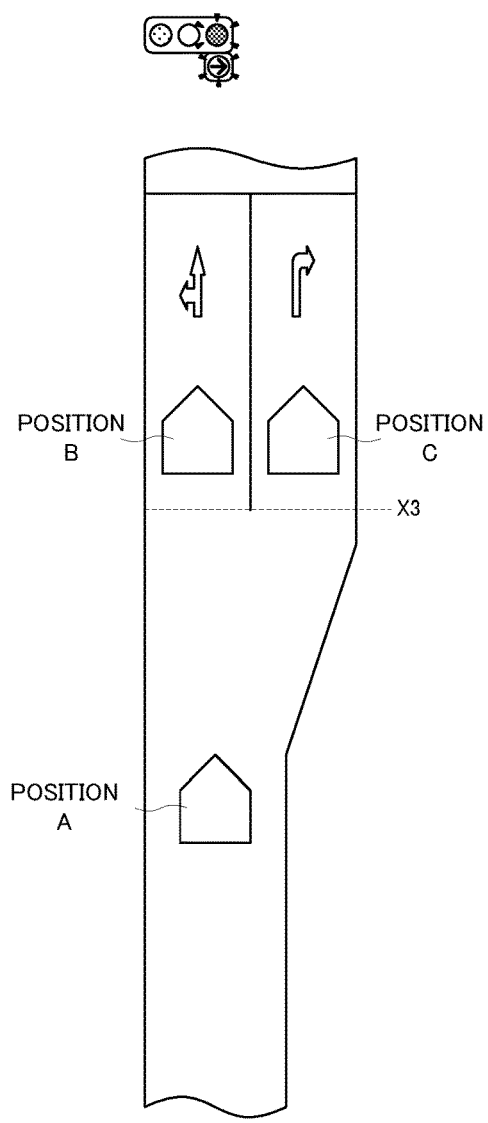
FIG. 2B is a diagram illustrating an intersection as an example of a support target of the driving support apparatus according to the first embodiment.

Here, the deceleration support control performed by the deceleration support unit 12 will be specifically explained with reference to FIG. 2A and FIG. 2B. FIG. 2A and FIG. 2B are diagrams illustrating an intersection as an example of a support target of the driving support apparatus according to the first embodiment. Here, the example includes an intersection with a right-turn lane, but is not limited thereto.

As illustrated in FIG. 2A, an explanation will be given to the deceleration support control when the light of a traffic light without an arrow traffic light is "red". In this case, the vehicle 1 needs to stop at a predetermined position before the intersection (e.g., on a stop line, or at a position distant by a predetermined distance from a rear part of a preceding vehicle if there is any preceding vehicle), regardless of whether the vehicle 1 runs on a going straight/left-turn lane or on the right-turn lane (refer to a position B and a position C in FIG. 2A), or even if selection of the going straight/left-turn lane and the right-turn lane is not certain or not confirmed yet, as illustrated in a position A in FIG. 2A. The deceleration support unit 12 may therefore provide the vehicle 1 with deceleration that allows the vehicle 1 to stop at the predetermined position, as the deceleration support control.

As illustrated in FIG. 2B, an explanation will be given to the deceleration support control when the light of a traffic light with an arrow traffic light is "red" and the arrow traffic light is an "arrow that allows a right turn". In this case, depending on the course of the vehicle 1, the vehicle 1 does not need to stop before the intersection. In other words, in this case, whether or not the vehicle 1 stops before the intersection is not determined uniquely.

If the vehicle 1 is at a position A in FIG. 2B, the deceleration support unit 12 cannot determine to which lane of the going straight/left-turn lane and the right-turn lane the vehicle 1 goes forward. In this case, the deceleration support unit 12 may provide the vehicle 1 with deceleration that allows the vehicle 1 to stop comfortably (i.e., without sudden braking) at the predetermined position before the intersection when the driver steps on a brake pedal, for example, at a position X3 at which the selection of the going straight/left-turn lane and the right-turn lane is fixed, as the deceleration support control. Alternatively, the deceleration support unit 12 may provide the vehicle 1 with deceleration that gives a relatively small interference with a right-turn action of the vehicle if the vehicle 1 turns right at the intersection.

If the vehicle 1 is at a position B in FIG. 2B, the deceleration support unit 12 may provide the vehicle 1 with deceleration that allows the vehicle 1 to stop at the predetermined position before the intersection, as the deceleration support control. If the vehicle 1 is at a position C in FIG. 2B, the vehicle 1 can enter the intersection and turn right. In this case, the deceleration support unit 12 may provide the vehicle 1 with deceleration that allows the vehicle 1 to enter the intersection at an appropriate speed, as the deceleration support control. Alternatively, the deceleration support unit 12 may not perform the deceleration support control.

(Deceleration Support Control Process)

Next, a deceleration support control process performed on the driving support apparatus 10 configured in the above manner will be explained with reference to a flowchart in FIG. 3.

In FIG. 3, the deceleration support unit 12 determines whether or not a support implementation condition is satisfied on the basis of a recognition result of the recognition processor 11 (step S101). In other words, the deceleration support unit 12 determines whether or not the support implementation condition, which is that the light color of the traffic light requires the deceleration or stop of the vehicle 1 (in other words, the vehicle 1 needs to be decelerated), is satisfied on the basis of the light of the traffic light recognized by the recognition processor 11. In the step S101, if it is determined that the support implementation condition is not satisfied (e.g., when the light color of the traffic light is green, etc.) (the step S101: No), the process illustrated in FIG. 3 is ended. Then, after a lapse of a predetermined time (e.g., several ten milliseconds to several hundred milliseconds), the step S101 is performed again.

In the step S101, if it is determined that the support implementation condition is satisfied (the step S101: Yes), the deceleration support unit 12 determines whether or not an instruction of the traffic light recognized by the recognition processor 11 depends on a state of the vehicle 1 (step S102). Here, the expression that the "instruction of the traffic light depends on the state of the vehicle 1" may mean that the meaning of the light of the traffic light changes depending on the course of the vehicle 1. The state that the "instruction of the traffic light depends on the state of the vehicle 1" may occur if the light of the traffic light recognized by the recognition processor 11 includes a light indicating permission to travel in a particular direction. Thus, the deceleration support unit 12 may determine whether or not the light of the traffic light recognized by the recognition processor 11 includes the light indicating the permission to travel in the particular direction, thereby determining whether or not the instruction of the traffic light recognized by the recognition processor 11 depends on the state of the vehicle 1. A possible specific example is that the traffic light recognized by the recognition processor 11 is provided with an arrow traffic light, that the light of the traffic light is, for example, "red" and the "arrow that allows a right turn", and that it is not fixed yet whether or not the vehicle 1 goes forward to the right-turn lane. Moreover, a case where each lane is provided with the traffic lane, also corresponds to the expression that the "instruction of the traffic light depends on the state of the vehicle 1".

In the step S102, if it is determined that the "instruction of the traffic light does not depend on the state of the vehicle 1" (e.g., if the light of the traffic light does not include the light indicating the permission to travel in the particular direction, as illustrated in FIG. 2A) (the step S102: No), the deceleration support unit 12 sets a target vehicle speed to "a" (which is, for example, a vehicle speed that allows the vehicle 1 to stop at the predetermined position before the intersection) (step S103). Then, the deceleration support unit 12 performs a deceleration support so that the vehicle speed of the vehicle 1 is the target vehicle speed of "a" (step S104).

Then, the deceleration support unit 12 determines whether or not a support removal condition is satisfied (step S105). In the step S105, if it is determined that the support removal condition is not satisfied (the step S105; No), the step S102 is performed. On the other hand, in the step S105, if it is determined that the support removal condition is satisfied (the step S105; Yes), the deceleration support unit 12 ends the deceleration support (step S106).

In the step S102, if it is determined that the "instruction of the traffic light depends on the state of the vehicle 1" (e.g., if the light of the traffic light includes the light indicating the permission to travel in the particular direction, as illustrated in FIG. 2B) (the step S102: Yes), the deceleration support unit 12 determines whether or not the state of the vehicle 1 is fixed (step S107). Here, the expression that the "state of the vehicle 1 is fixed" may mean that a lane on which the vehicle 1 runs is fixed (and as a result, the course of the vehicle can be specified).

The deceleration support unit 12 determines that the lane on which the vehicle 1 runs is fixed, for example, if at least one of the lines that indicate the lane is a yellow continuous line, (ii) at least one of the lines that indicate the lane is a white continuous line, (iii) a distance from the vehicle 1 to the stop line is less than or equal to a predetermined value (e.g., 30 meters), or in similar cases.

In the step S107, if it is determined that the state of the vehicle 1 is not fixed yet (e.g., in the case of at the position A in FIG. 2B) (the step S107: No), a step S109 described later is performed. On the other hand, in the step S107, if it is determined that the state of the vehicle 1 is fixed (the step S107: Yes), the deceleration support unit 12 determines whether or not a stop instruction is fixed (step S108). Here, the expression that the "stop instruction is fixed" may mean that the stop instruction by the light of the traffic light with respect to the lane on which the vehicle 1 runs is fixed. For example, in the situation in which the light of the traffic light includes the light indicating the permission to travel in the particular direction, if the course of the vehicle 1 that can be specified from the lane is not the course for moving in the particular direction for which the permission to travel is indicated by the traffic light, the vehicle 1 is not allowed to travel by the traffic light. Thus, the deceleration support unit 12 may determine that the stop instruction is fixed.

In the step S108, if it is determined that the stop instruction is fixed (the step S108: Yes), the step S103 is performed. On the other hand, if it is determined that the stop instruction is not fixed yet (the step S108: No), the deceleration support unit 12 sets the target vehicle speed to "b", wherein the target vehicle speed "b" is greater than the target vehicle speed "a" at least at a target stop position of the vehicle 1 (step S109). Then, the deceleration support unit 12 performs the deceleration support so that the vehicle speed of the vehicle 1 is the target vehicle speed of "b" (step S110). Then, the step S105 is performed.

The support implementation condition may include, for example, that the light of the traffic light is red, but the other requirements may be set arbitrarily. In the same manner, the support removal condition may include, for example, (i) that the vehicle speed of the vehicle 1 reaches the target vehicle speed and (ii) that the vehicle 1 reaches the target stop position, but the other requirements may be set arbitrarily. Moreover, the target vehicle speeds "a" and "b" may change, for example, depending on the speed of the vehicle 1, a road congestion situation, or the like.

Next, an example of the change in the vehicle speed of the vehicle 1 caused by the deceleration support control process illustrated in FIG. 3 will be explained with reference to FIG. 4A to FIG. 4C. FIG. 4A to FIG. 4C are graphs illustrating the change in the vehicle speed of the vehicle 1 caused by the deceleration support control process according to the first embodiment. FIG. 4A illustrates an example of the change in the vehicle speed of the vehicle 1 caused by the deceleration support control process when the arrow traffic light is not provided, for example, as illustrated in FIG. 2A. FIG. 4B illustrates an example of the change in the vehicle speed of the vehicle 1 caused by the deceleration support control process when the traffic light is provided with the arrow traffic light, for example, as illustrated in FIG. 2B, and when the vehicle 1 is not allowed to enter the intersection by the traffic light. FIG. 4C illustrates an example of the change in the vehicle speed of the vehicle 1 caused by the deceleration support control process when the traffic light is provided with the arrow traffic light, for example, as illustrated in FIG. 2B, and when the vehicle 1 is allowed to enter the intersection by the traffic light.

In FIG. 4A to FIG. 4C, a position X1 corresponds to a position at which the traffic light with a red light is recognized by the recognition processor 11. A position X2 corresponds to a position at which the deceleration support is started by the deceleration support unit 12. A position X3 corresponds to a position at which the state of the vehicle 1 is fixed (refer to, for example, the position X3 in FIG. 2B). A position X4 corresponds to the target stop position of the vehicle 1.

If the light of the traffic light without the arrow traffic light is "red", it is determined in the aforementioned step S102 that the instruction of the traffic light does not depend on the state of the vehicle 1. In this case, the deceleration support unit 12 may set the target vehicle speed at the target stop position, for example, to "a". As a result, as illustrated in FIG. 4A, the deceleration support that allows the target vehicle speed "a" at the position X4 is started from a time point at which the vehicle 1 runs at the position X2. If the light of the traffic light with the arrow traffic light is "red" and the "arrow that allows a right turn", it is determined in the aforementioned step S102 that the instruction of the traffic light depends on the state of the vehicle 1. In this case, the deceleration support unit 12 may set the target vehicle speed at the target stop position, for example, to "b", until it is determined that the state of the vehicle 1 is fixed at least in the aforementioned step S107. As a result, as illustrated in FIG. 4B and FIG. 4C, the deceleration support that allows the target vehicle speed "b" at the position X4 is performed in a period in which the vehicle 1 runs from the position X2 to the position X3.

Then, for example, if the vehicle 1 enters the going straight/left-turn lane as illustrated in FIG. 2B, it is determined in the aforementioned step S107 that the state of the vehicle 1 is fixed. Then, in the aforementioned step S108, if it is determined that the stop instruction is fixed, the deceleration support unit 12 may set the target vehicle speed at the target stop position, for example, to "a". As a result, as illustrated in FIG. 4B, the deceleration increases from a time position at which the vehicle 1 runs at the position X3, so that the target vehicle speed is "a" at the position X4.

On the other hand, for example, if the vehicle 1 enters the right-turn lane as illustrated in FIG. 2B, it is determined in the aforementioned step S107 that the state of the vehicle 1 is fixed, but it is determined in the aforementioned step S108 that the stop instruction is not fixed yet. As a result, as illustrated in FIG. 4C, the deceleration support that allows the target vehicle speed "b" at the position X4 is continued.

(Technical Effect)

If the vehicle is driven by the driver and if the course of the vehicle is unknown, the deceleration support control cannot be performed until the driver's intension is fixed (in other words, until the course of the vehicle is fixed) in some cases, specifically, for example, as illustrated in FIG. 0.2B, when the traffic light without the arrow traffic light is provided, or in similar cases.

On the driving support apparatus 10, however, firstly, the content of the deceleration support may be changed depending on whether or not the instruction of the traffic light depends on the state (or course) of the vehicle 1 (refer to the steps S102, S103, and S109 in FIG. 3, etc.). Moreover, on the driving support apparatus 10, if the instruction of the traffic light depends on the state of the vehicle 1, the content of the deceleration support may be changed depending on whether or not the state (or course) of the vehicle 1 and/or the stop instruction for the vehicle 1 is fixed (refer to the steps S103, S107, S108, and S109 in FIG. 3, etc.).

Thus, on the driving support apparatus 10, even if the vehicle 1 is driven by the driver and even if the course of the vehicle 1 is unknown, it is possible to perform the deceleration support control before the driver's intension is fixed. In addition, if the instruction of the traffic light depends on the state of the vehicle 1 and before the state of the vehicle 1 is fixed (i.e., before the driver's intension is fixed), such a deceleration support that allows a smaller deceleration of the vehicle 1 than the deceleration when the state of the vehicle 1 is fixed and after the stop instruction for the vehicle 1 is fixed, may be performed. It is thus possible to prevent that the driving support apparatus 10 excessively intervenes in the driver's driving of the vehicle 1 before the driver's intension is fixed.

Modified Example

Figure 5:
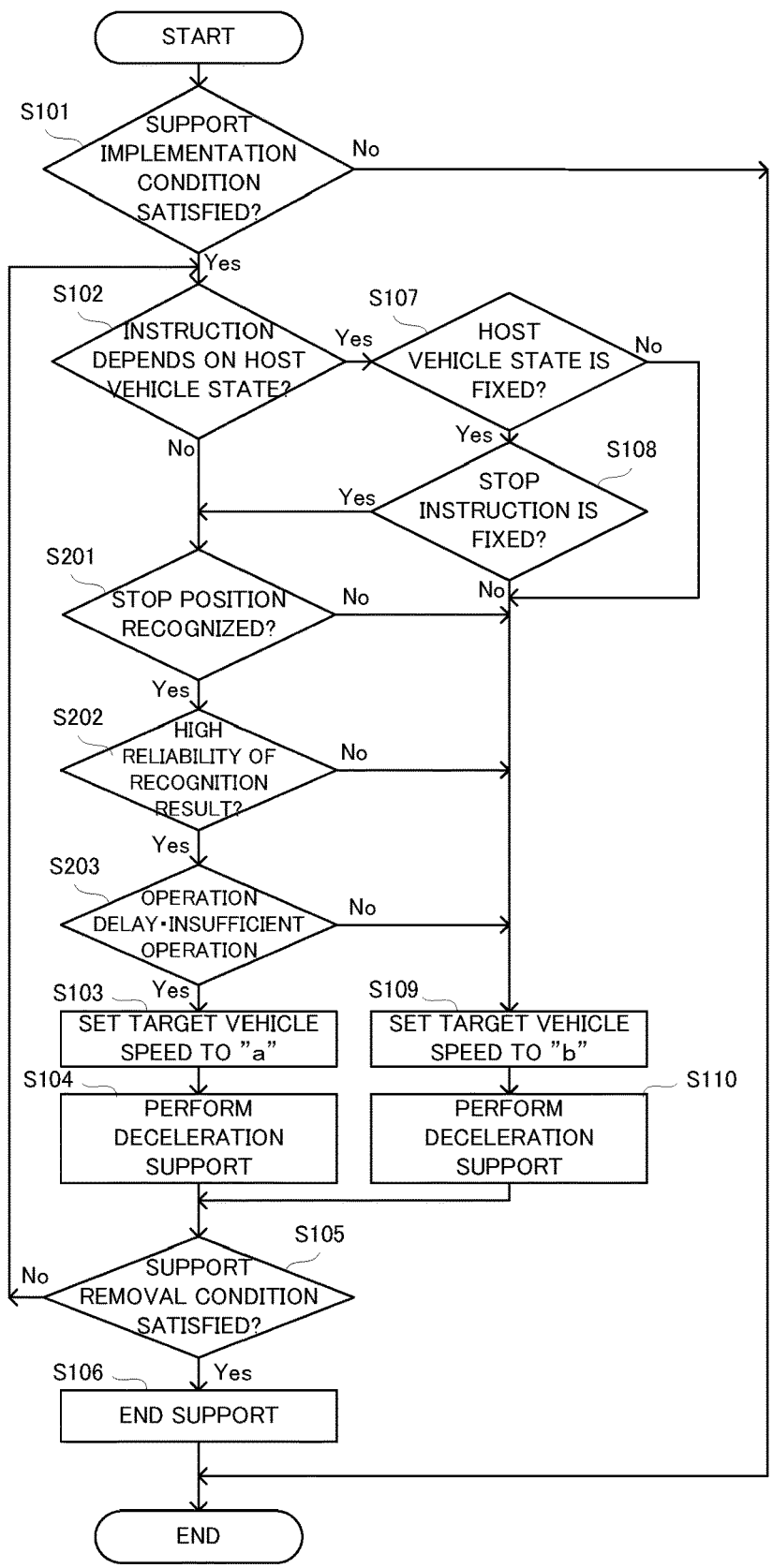
FIG. 5 is a flowchart illustrating a deceleration support control process according to a modified example of the first embodiment.

Next, a modified example of the driving support apparatus 10 according to the first embodiment described above will be explained with reference to a flowchart in FIG. 5.
(Deceleration Support Control Process)

In the step S102, if the instruction of the traffic light does not depend on the state of the vehicle 1 (the step S102: No), or in the step S108, if it is determined that the stop instruction is fixed (the step S108: Yes), the deceleration support unit 12 determines whether or not the target stop position of the vehicle 1 is recognized by the recognition processor 11 (step S201).

For example, if the stop line is recognized by the recognition processor 11, the deceleration support unit 12 may determine that the target stop position of the vehicle 1 is recognized by the recognition processor 11.

In the step S201, if it is determined that the target stop position is not recognized (the step S201: No), the step S109 is performed. On the other hand, in the step S201, if it is determined that the target stop position is recognized (the step S201: Yes), the deceleration support unit 12 determines whether or not the reliability of the recognition result of the recognition processor 11 is relatively high (e.g., whether or not a numerical value indicating the reliability of the recognition result is greater than a threshold value) (step S202).

The "recognition result" may include not only the target stop position in the step S201, but also, for example, the type of the traffic light (with/without the arrow traffic light, etc.) and the light, or the like.

In the step S202, if it is determined that the reliability of the recognition result is not relatively high (the step S202: No), the step S109 is performed. On the other hand, in the step S202, if it is determined that the reliability of the recognition result is relatively high (the step S202: Yes), the deceleration support unit 12 performs a determination associated with an operation delay and an insufficient operation of the driver of the vehicle 1 (step S203). The existing various aspects can be applied to a determination method associated with the operation delay and the insufficient operation, and a detailed explanation of the method will be thus omitted.

In the step S203, if it is determined that there is at least one of the operation delay and the insufficient operation (the step S203: Yes), the deceleration support unit 12 performs the step S103. On the other hand, in the step S203, if it is determined that there is neither operation delay nor insufficient operation (the step S203: No), the deceleration support unit 12 performs the step S109.

By virtue of such a configuration, it is possible to perform the deceleration support control in which the driver's driving of the vehicle 1 is valued. The deceleration support control process is not limited to the process illustrated in FIG. 5, but may include at least one of the steps S201, S202, and S203.

Figure 6A:
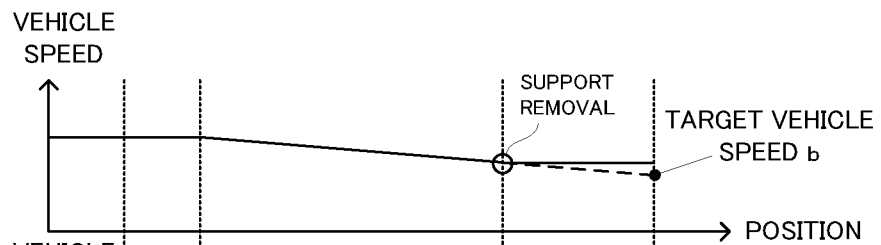
FIG. 6A is a graph illustrating an example of the change in the vehicle speed caused by a deceleration support control process according to another modified example of the first embodiment.

Other Modified Examples (1) In the deceleration support control process illustrated in FIG. 3, if it is determined in the step S108 that the stop instruction is not fixed yet, the target vehicle speed is set to "b" before the deceleration support is performed. Thus, even if it is determined in the step S107 that the state (or course) of the vehicle 1 is fixed and even if the vehicle 1 is allowed to enter the intersection, for example, by the arrow traffic light, the deceleration support continues to be performed because the stop instruction is not fixed. However, if the state (or course) of the vehicle 1 is fixed and if the vehicle 1 is allowed to enter the intersection by the arrow traffic light, then, it is relatively less necessary to perform the deceleration support. Thus, if it is determined in the step S107 that the state (or course) of the vehicle 1 is fixed and if the vehicle 1 is allowed to enter the intersection, for example, by the arrow traffic light, the deceleration support control process may be immediately removed (e.g., refer to FIG. 6A).

Figure 6B:
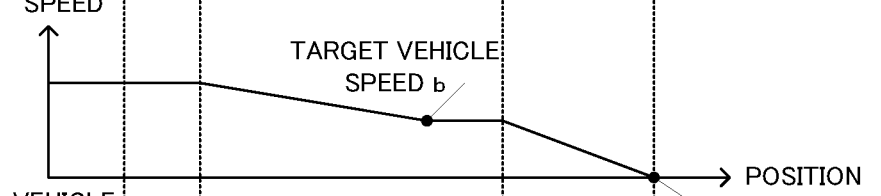
FIG. 6B is a graph illustrating an example of the change in the vehicle speed caused by a deceleration support control process according to another modified example of the first embodiment.
Figure 6C:
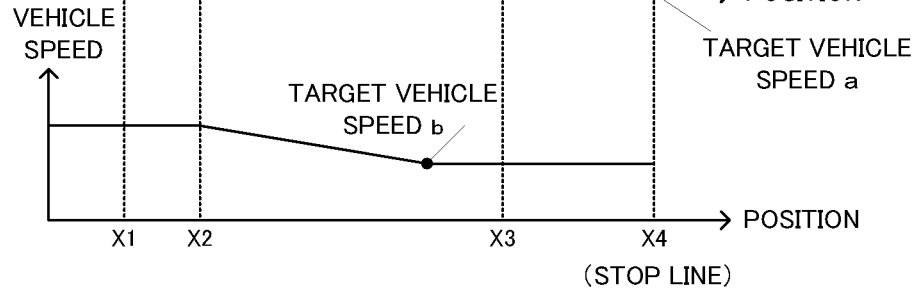
FIG. 6C is a graph illustrating an example of the change in the vehicle speed caused by a deceleration support control process according to another modified example of the first embodiment.

(2) For example, if the stop line, which is an example of the target stop position, is recognized from the images taken by the camera mounted on the vehicle 1, in many cases, the recognition processor 11 cannot recognize the stop line at a time point at which the recognition processor 11 recognizes the traffic light. Thus, the target vehicle speed may be set without setting the target stop position. In this case, for example, as illustrated in FIG. 6B and FIG. 6C, when the vehicle speed of the vehicle 1 reaches the target vehicle speed "b", the deceleration support unit 12 may control the vehicle 1 to maintain the target vehicle speed "b". Alternatively, the deceleration support control process may be temporarily removed.

Then, if the state of the vehicle 1 is fixed (the step S107: Yes) and if the stop instruction is fixed (the step S108: Yes), the deceleration support unit 12 may set the target vehicle speed to "a" and may perform the deceleration support (refer to positions X3 to X4 in FIG. 6B). On the other hand, if the state of the vehicle 1 is fixed (the step S107: Yes) but if the stop instruction is not fixed yet (the step S108: No), the deceleration support unit 12 may control the vehicle 1 to maintain the target vehicle speed "b" (refer to positions X3 to X4 in FIG. 6C).

(3) The recognition processor 11 may recognize not only the traffic light, but also a pedestrian crossing, a railroad crossing, a temporary stop sign, a temporary stop mark, and so on.

The pedestrian crossing, the railroad crossing, the temporary stop sign, and the temporary stop mark may correspond to cases where the "(stop) instruction does not depend on the state of the vehicle 1".

Second Embodiment

A driving support apparatus according to a second embodiment will be explained with reference to FIG. 7. The second embodiment is the same as the aforementioned first embodiment, except that a display support is performed, instead of the deceleration support. Thus, in the second embodiment, the same explanation as that in the first embodiment will be omitted, and the same parts on the drawing will carry the same reference numerals. Only a basically different point will be explained with reference to FIG. 7.

(Display Support Process)

In the step S102, if it is determined that the instruction of the traffic light does not depend on the state of the vehicle 1 (the step S102: No), or in the step S108, if it is determined that the stop instruction is fixed (the step S108: Yes), the deceleration support unit 12 performs a predetermined display support (step S301).

An example of the display support may include (i) displaying a message, such as "red light ahead", on a not-illustrated display, (ii) displaying an image indicating the red light on the display, (iii) displaying the message and the image on the display, and so on. In the step S301, in addition to the display support, for example, a sound indicating that the vehicle 1 needs to be decelerated or stopped, may be produced.

Then, the deceleration support unit 12 determines whether or not a support removal condition is satisfied (step S302). In the step S302, if it is determined that the support removal condition is not satisfied (the step S302: No), the step S102 is performed. On the other hand, in the step S302, if it is determined that the support removal condition is satisfied (the step S302: Yes), the deceleration support unit 12 ends the display support (step S303). The support removal condition in the step S302 may be the same as the support removal condition in the step S105 in FIG. 3 described above.

In the second embodiment, in the step S107, if it is determined that the state of the vehicle 1 is not fixed yet (the step S107: No), and in the step S108, if it is determined that the stop instruction is not fixed yet (the step S108: No), the display support is not performed.

Modified Example

Figure 8:
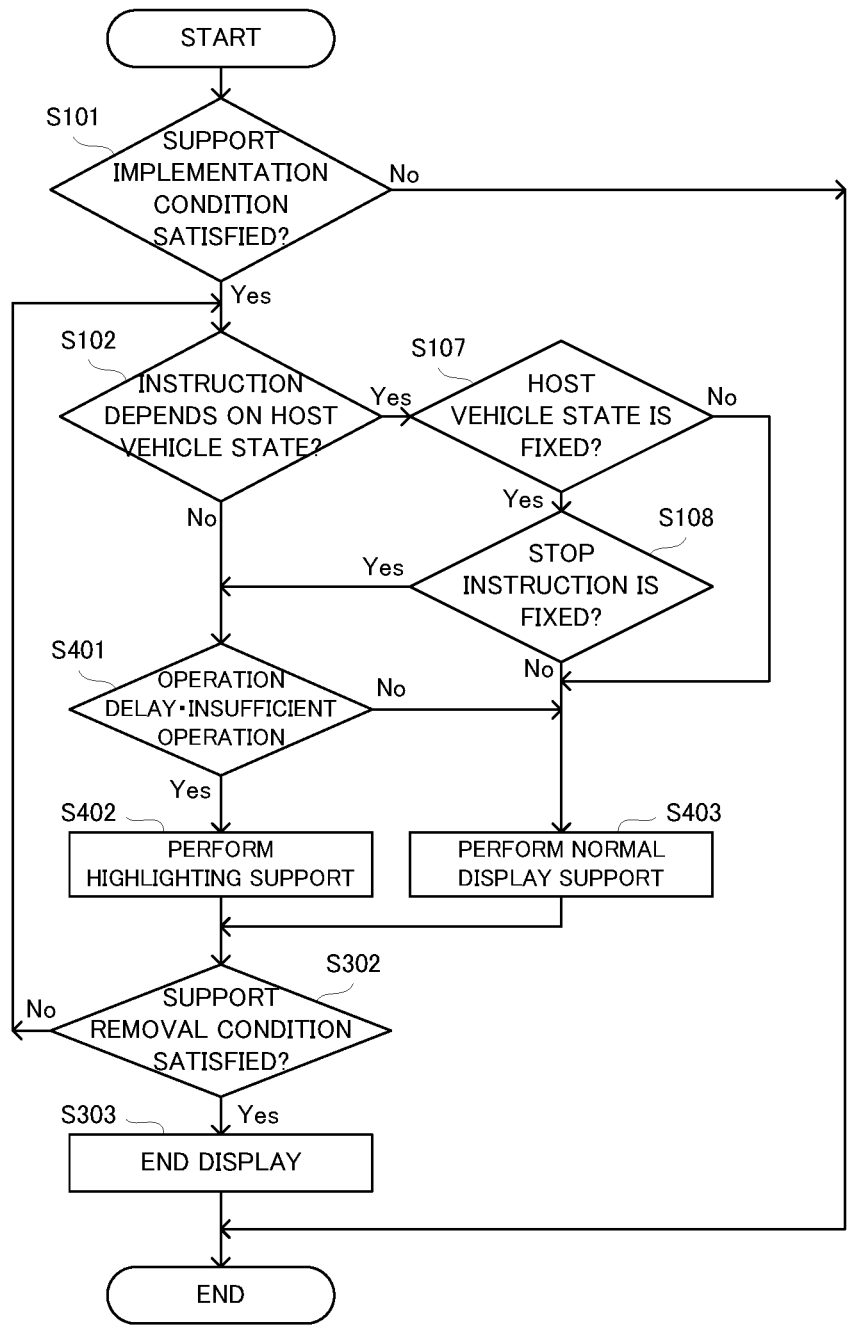
FIG. 8 is a flowchart illustrating a display support process according to a modified example of the second embodiment.

Next, a modified example of the driving support apparatus 10 according to the second embodiment described above will be explained with reference to a flowchart in FIG. 8.

(Display Support Process)

In the step S102, if it is determined that the instruction of the traffic light does not depend on the state of the vehicle 1 (the step S102: No), or in the step S108, if it is determined that the stop instruction is fixed (the step S108: Yes), the deceleration support unit 12 performs a determination associated with an operation delay and an insufficient operation of the driver of the vehicle 1 (step S401). A determination method associated with the operation delay and the insufficient operation in the step S401 may be the same as the determination method associated with the operation delay and the insufficient operation in the step S203 in FIG. 5 described above.

In the step S401, if it is determined that there is at least one of the operation delay and the insufficient operation (the step S401: Yes), the deceleration support unit 12 performs a predetermined highlighting support (step S402). An example of the highlighting support may include blinking a message, such as "red light ahead" and an image indicating the red light, on the display.

On the other hand, in the step S401, if it is determined that there is neither operation delay nor insufficient operation (the step S401: No), the deceleration support unit 12 performs a predetermined normal display support (step S403). An example of the normal display support may include displaying, but without blinking, a message, such as "red light ahead" and an image indicating the red light, on the display.

In the step S108, if it is determined that the stop instruction is not fixed yet (the step S108: No), the step S403 is performed.

Various aspects of embodiments of the present disclosure derived from the embodiments and modified examples explained above will be explained hereinafter.

A driving support apparatus according to an aspect of embodiments of the present disclosure is provided with: a recognizer configured to recognize a light of a traffic light that exists ahead of a host vehicle; and a controller configured to perform a deceleration support control if the host vehicle needs to be decelerated on the basis of the recognized light, wherein the controller is configured to suppress a degree of the deceleration support control if the host vehicle needs to be decelerated on the basis of the recognized light and if the recognized light includes a light indicating permission to travel in a particular direction, in comparison with when the recognized light does not include the light indicating the permission to travel in the particular direction.

In the aforementioned embodiments, the recognition processor 11 corresponds to an example of the recognizer, and the deceleration support unit 12 corresponds to an example of the controller. The "deceleration support control" is not limited to automatically decelerate the host vehicle by applying a braking force, but may conceptually include, for example, notifying the driver of the host vehicle of the necessity of the deceleration. In the aforementioned embodiments, the deceleration support control process and the display support process correspond to an example of the deceleration support control.

If there is the light indicating the permission to travel in the particular direction, in some cases, the host vehicle does not need to be decelerated enough to stop, depending on the course of the host vehicle. If the deceleration support is performed in this case, the deceleration that differs from the intention of the driver of the host vehicle is possibly performed. Alternatively, if the deceleration support is not performed until the course of the host vehicle is fixed, there is a possibility that an effect expected by the deceleration support is not obtained.

On the driving support apparatus, however, if the host vehicle needs to be decelerated and if the light indicating permission to travel in the particular direction is included, the degree of the deceleration support control is suppressed, in comparison with when the light indicating the permission to travel in the particular direction is not included. In other words, according to the driving support apparatus, it is possible to perform the deceleration support that takes into account the arrow traffic light (which corresponds to the light indicating the permission to travel in the particular direction.

In an aspect of the driving support apparatus, the driving support apparatus comprises a specifier configured to specify a course of the host vehicle, and the controller is configured to suppress the degree of the deceleration support control if the host vehicle needs to be decelerated on the basis of the recognized light and the course is not specified by said specifier, and if the recognized light includes the light indicating the permission to travel in the particular direction, in comparison with when the recognized light does not include the light indicating the permission to travel in the particular direction, or in comparison with when the recognized light includes the light indicating the permission to travel in the particular direction and the course specified by said specifier is not a course for travelling in the particular direction. According to this aspect, it is possible to perform the deceleration support that takes into account the arrow traffic light The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving support apparatus comprising:
a recognizer configured to recognize a light of a traffic light that exists ahead of a host vehicle; and
a controller configured to perform a deceleration support control if the recognized light requires deceleration or stop of the host vehicle, wherein
when the driving support apparatus does not specify a course of the host vehicle, the deceleration support control, which is performed by the controller, decelerates the host vehicle such that a target vehicle speed when the recognized light permits the host vehicle to travel in a particular direction while requiring deceleration or stop of the host vehicle is high in comparison with a target vehicle speed when the recognized light does not permit the host vehicle to travel in the particular direction while requiring deceleration or stop of the host vehicle.

2. A driving support apparatus comprising:
a recognizer configured to recognize a light of a traffic light that exists ahead of a host vehicle; and
a controller configured to perform a deceleration support control if the recognized light requires deceleration or stop of the host vehicle, wherein
said controller is configured to suppress a degree of the deceleration support control when the recognized light permits the host vehicle to travel in a particular direction while requiring deceleration or stop of the host vehicle, in comparison with when the recognized light requires deceleration or stop of the host vehicle, wherein
the driving support apparatus comprises a specifier configured to specify a course of the host vehicle, and
said controller is configured to suppress the degree of the deceleration support control when the recognized light permits the host vehicle to travel in the particular direction while requiring deceleration or stop of the host vehicle and the course is not specified by said specifier, in comparison with when the recognized light requires deceleration or stop of the host vehicle, or in comparison with when the recognized light permits the host vehicle to travel in the particular direction while requiring deceleration or stop of the host vehicle and the course specified by said specifier is not a course for travelling in the particular direction.

* * * * *